US007798948B2

(12) United States Patent
Kawamura et al.

(10) Patent No.: US 7,798,948 B2
(45) Date of Patent: Sep. 21, 2010

(54) ELECTROPHOTOGRAPHIC DEVELOPING MEMBER, PROCESS FOR ITS PRODUCTION, ELECTROPHOTOGRAPHIC PROCESS CARTRIDGE AND ELECTROPHOTOGRAPHIC IMAGE FORMING APPARATUS

(75) Inventors: Kunimasa Kawamura, Suntou-gun (JP); Arihiro Yamamoto, Ushiku (JP); Kazutoshi Ishida, Numazu (JP); Minoru Nakamura, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/533,201

(22) Filed: Jul. 31, 2009

(65) Prior Publication Data

US 2009/0290907 A1 Nov. 26, 2009

Related U.S. Application Data

(63) Continuation of application No. PCT/JP2009/051913, filed on Jan. 29, 2009.

(30) Foreign Application Priority Data

Feb. 7, 2008 (JP) ............................ 2008-027633

(51) Int. Cl.
*B05C 1/08* (2006.01)
*F16C 13/00* (2006.01)
*B21K 1/02* (2006.01)
*G03G 15/08* (2006.01)

(52) U.S. Cl. ............................ 492/18; 492/17; 492/56; 29/895.32; 399/286; 399/111; 399/119

(58) Field of Classification Search .................. 492/17, 492/18, 38, 56, 59; 29/895.32, 895, 895.2, 29/895.21, 895.211; 399/286, 176, 279, 399/111, 119
See application file for complete search history.

(56) References Cited

U.S. PATENT DOCUMENTS 6,067,434 A * 5/2000 Takagi et al. ................ 399/286

(Continued)

FOREIGN PATENT DOCUMENTS

JP 2001-109258 4/2001

(Continued)

OTHER PUBLICATIONS

International Search Report (PCT/JP2009/051913) (Form PCT/ISA/210); Written Opinion of the International Searching Authority (PCT/JP2009/051913) (Form PCT/ISA/237).

(Continued)

*Primary Examiner*—David P Bryant
*Assistant Examiner*—Sarang Afzali
(74) *Attorney, Agent, or Firm*—Fitzpatrick, Cella, Harper & Scinto

(57) ABSTRACT

To provide an electrophotographic developing member which can both be kept from the sticking of a developer and be kept from being deformed by its contacting members, and can form stable images over a long period of time. An electrophotographic developing member characterized in that its surface layer satisfies the following expressions (1) to (3) where the average crosslinking density in each region of up to 100 nm in depth, from 100 nm to 200 nm in depth and from 200 nm to 300 nm in depth from the surface of the surface layer is represented by C1, C2 and C3 (mol/cm$^3$), respectively:

$$C3<C2<C1; \quad (1)$$

$$C3\times1.3\leqq C1\leqq C3\times5.0;\ \text{and} \quad (2)$$

$$2.0\times10^{-4}\leqq C3\leqq7.0\times10^{-4}. \quad (3)$$

10 Claims, 3 Drawing Sheets

U.S. PATENT DOCUMENTS

| | | | | |
|---|---|---|---|---|
| 6,416,915 | B1 * | 7/2002 | Kikuchi et al. | 430/56 |
| 6,941,100 | B2 * | 9/2005 | Yamada et al. | 399/279 |
| 6,998,210 | B2 * | 2/2006 | Yoshimura et al. | 430/66 |
| 2003/0139270 | A1 | 7/2003 | Jung et al. | 492/56 |
| 2005/0202946 | A1 * | 9/2005 | Hattori et al. | 492/56 |
| 2007/0078046 | A1 * | 4/2007 | Matsumura | 492/56 |
| 2007/0111872 | A1 | 5/2007 | Nakamura et al. | 492/53 |
| 2008/0081277 | A1 | 4/2008 | Nakamura et al. | 430/111.1 |
| 2009/0067880 | A1 * | 3/2009 | Kuroda et al. | 399/111 |
| 2009/0080933 | A1 * | 3/2009 | Kuruma et al. | 399/111 |
| 2009/0238601 | A1 * | 9/2009 | Kuroda et al. | 399/111 |

FOREIGN PATENT DOCUMENTS

| | | |
|---|---|---|
| JP | 2001-235941 | 8/2001 |
| JP | 2001-290362 | 10/2001 |
| JP | 2001-241139 | 12/2001 |
| JP | 2002-039162 | 2/2002 |
| JP | 2002-286024 | 10/2002 |
| JP | 2003-263021 | 9/2003 |
| JP | 2005-274650 | 10/2005 |
| JP | 2006-301511 | 11/2006 |
| JP | 2007-291298 | 11/2007 |
| JP | 2008-304768 | 12/2008 |

OTHER PUBLICATIONS

English-language translation of the International Search Report (PCT/JP2009/051913)—2 Pages.

* cited by examiner

ELECTROPHOTOGRAPHIC DEVELOPING MEMBER, PROCESS FOR ITS PRODUCTION, ELECTROPHOTOGRAPHIC PROCESS CARTRIDGE AND ELECTROPHOTOGRAPHIC IMAGE FORMING APPARATUS

CROSS-REFERENCE TO RELATED APPLICATIONS

This application is a continuation of International Application No. PCT/JP2009/051913, filed Jan. 29, 2009, which claims the benefit of Japanese Patent Application No. 2008-027633, filed Feb. 7, 2008.

BACKGROUND OF THE INVENTION

1. Field of the Invention

This invention relates to an electrophotographic developing member (hereinafter also simply "developing member") used in electrophotographic image forming apparatus and a process for its production. This invention further relates to an electrophotographic process cartridge having this electrophotographic developing member, and also to an electrophotographic image forming apparatus.

2. Description of the Related Art

In recent years, in electrophotographic image forming apparatus, the performance that is required for electrophotographic developing members which feed developers to electrophotographic photosensitive members on which electrostatic latent images have been formed has become higher with progress toward higher speed and higher image quality.

In Japanese Patent Application Laid-open No. 2001-235941, it is disclosed to set the hardness of a surface layer of a developing member (developer carrying member) higher than that of an inner layer so as to bring the developing member into uniform contact with an electrophotographic photosensitive member, and also set the developing nip small in width so as to enable formation of uniform and good-contrast images. This technique enables formation of images with a good image quality at halftone areas.

SUMMARY OF THE INVENTION

The present inventors have made many studies on the constitution disclosed in the above Japanese Patent Application Laid-open No. 2001-235941. As the result, they have found that, because of a high hardness of the surface layer, the developing member according to Japanese Patent Application Laid-open No. 2001-235941 can well be kept from being deformed when it comes into contact with a developing blade and so forth, but it may inevitably bring about a new problem that its surface tends to come to stain because of the sticking of a developer thereto. Accordingly, the present invention is directed to provide an electrophotographic developing member which can both be kept from the sticking of a developer and be kept from being deformed by its contacting members (members coming into contact therewith), and can form stable images over a long period of time.

According to one aspect of the present invention, there is provided an electrophotographic developing member comprising a mandrel and a surface layer containing a urethane resin, provided on the peripheral surface of the mandrel, wherein; the surface layer satisfies the following expressions (1) to (3) where the average crosslinking density in each region of up to 100 nm in depth, from 100 nm to 200 nm in depth and from 200-nm to 300 nm in depth from the surface of the surface layer is represented by C1, C2 and C3 (mol/cm$^3$), respectively:

$$C3<C2<C1; \quad (1)$$

$$C3\times1.3\leqq C1\leqq C3\times5.0;\text{ and} \quad (2)$$

$$2.0\times10^{-4}\leqq C3\leqq 7.0\times10^{-4}. \quad (3)$$

According to another aspect of the present invention, there is provided a process for producing the above electrophotographic developing member of the present invention; the process comprising the step of subjecting a cured film of a coating film of a raw-material solution for the surface layer to plasma processing under atmospheric pressure.

According to further aspect of the present invention, there is provided an electrophotographic process cartridge having at least a photosensitive member for forming thereon an electrostatic latent image and an electrophotographic developing member of the present invention, and being so constituted as to be detachably mountable to an electrophotographic image forming apparatus.

According to still another aspect of the present invention, there is provided an electrophotographic image forming apparatus having at least a photosensitive member for forming thereon an electrostatic latent image and an electrophotographic developing member of the present invention.

According to the present invention, it can provide an electrophotographic developing member which can both be kept from the sticking of a developer and be kept from being deformed by its contacting members, and can form stable images over a long period of time. According to the present invention, it can also provide an electrophotographic process cartridge, and an electrophotographic image forming apparatus, which can form stable images over a long period of time.

Further features of the present invention will become apparent from the following description of exemplary embodiments with reference to the attached drawings.

BRIEF DESCRIPTION OF THE DRAWINGS

FIG. 1A shows a section parallel to its lengthwise direction and FIG. 1B shows a section perpendicular to its lengthwise direction.

FIG. 2A shows a section parallel to its lengthwise direction and FIG. 2B shows a section perpendicular to its lengthwise direction.

DESCRIPTION OF THE EMBODIMENTS

Figure 1A:
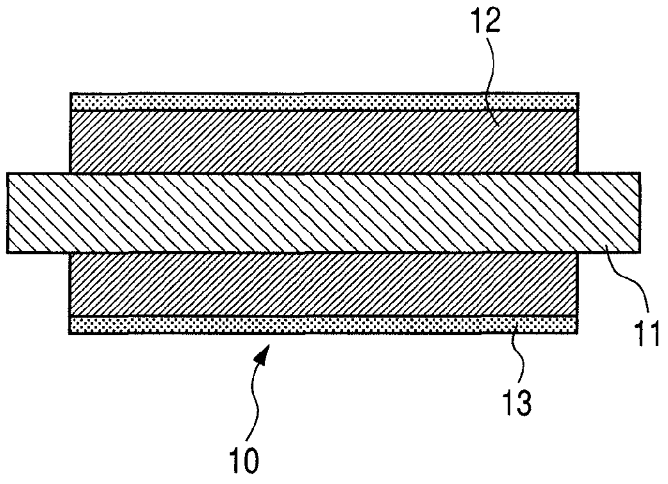
FIGS. 1A and 1B show an example of the electrophotographic developing member of the present invention, where

Preferred embodiments of the present invention will now be described in detail in accordance with the accompanying drawings.

The present inventors have discovered that crosslinking densities in regions of up to 300 nm in depth from the surface of an electrophotographic developing member on which a surface layer containing a urethane resin has been formed may be controlled within the range of the present invention, and such a developing member can both be kept from the sticking of a developer thereto and be kept from being deformed by its contacting members.

More specifically, the sticking of a developer may come about when the developer is crushed down by the pressure that acts between the developing member and a photosensitive drum or developing blade coming into contact with the former. From this fact, the surface layer containing a urethane resin may be made to have a low average crosslinking density, and this is effective for the developing member to be kept from the sticking of a developer thereto. On the other hand, in order for the developing member to be kept from being deformed by its contacting members, it is effective to make the surface layer have a high average crosslinking density so as to make the deformation small in level that is due to the photosensitive drum or developing blade coming into contact therewith. Accordingly, it has conventionally been necessary for the surface layer to be set to an average crosslinking density taking account of a balance between the sticking of a developer and the deformation due to the contacting member, and this has imposed a limitation on the freedom of designing.

The present inventors have made extensive studies on the relationship between the deterioration of developers and the hardness of developing members. As the result, they have discovered that the extent of the sticking of a developer to the surface of the surface layer and the extent of the deformation of surface layer that is due to the contacting member show a good correlation with the crosslinking densities in regions of up to 300 nm in depth from the surface of the surface layer in its whole depth direction.

Then, they have discovered that, on the basis of the average crosslinking density in a region of from 200 nm to 300 nm in depth from the surface of the surface layer as specified in the above expression (3), the average crosslinking densities in regions on the side nearer to the surface than the former region may be set relatively high as specified in the above expressions (1) and (2), and this can well settle the subject according to the present invention.

More specifically, the electrophotographic developing member according to the present invention has a mandrel and a surface layer containing a urethane resin, provided on the peripheral surface of the mandrel. Then, the surface layer satisfies the following expressions (1) to (3) where the average crosslinking density in each region of up to 100 nm in depth, from 100 nm to 200 nm in depth and from 200 nm to 300 nm in depth from the surface of the surface layer as measured by micro-sampling mass spectrometry is represented by C1, C2 and C3 (mol/cm$^3$), respectively:

$$C3<C2<C1; \quad (1)$$

$$C3\times1.3\leqq C1\leqq C3\times5.0; \text{ and} \quad (2)$$

$$2.0\times10^{-4}\leqq C3\leqq7.0\times10^{-4}. \quad (3)$$

The technical significance of conditions (1) to (3) according to the present invention is explained below.

First, the crosslinking density in the region of from 200 nm to 300 nm in depth (hereinafter often also "far-depth region") from the surface of the surface layer as shown in the above expression (3) corresponds to the crosslinking density of the urethane resin present in the far-depth region. Then, as having crosslinking density in this degree, the surface layer can have such softness that it may by no means apply any excess stress to the toner.

Next, the expression (1) means that, in the regions of up to 300 nm from its surface in the depth direction, the surface layer according to the present invention increases in crosslinking density as the region is nearer to the surface. The expression (2) also shows the extent of increase in crosslinking density of the urethane resin in the region of up to 100 nm from the surface, with respect to the crosslinking density in the far-depth region.

Then, the surface layer which is so formed as to increase in crosslinking density toward the surface side as defined by the expressions (1) and (2), with respect to its crosslinking density in the far-depth region, can not easily cause compression set even where the contacting member comes into contact with it at its same position over a long period of time. Nevertheless, it can even be one having such softness that it may by no means apply any excess stress to the developer.

The surface layer that fulfills the above conditions (1) to (3) may be obtained by forming a cured film (a urethane resin film) of a urethane resin raw-material solution for forming the surface layer, and thereafter subjecting the urethane resin film formed to plasma processing under atmospheric pressure. More specifically, such plasma processing enables the urethane resin film to be made higher in crosslinking density at its surface and in the vicinity thereof. On the other hand, the urethane resin film at its part distant from the surface may little change in its crosslinking density even when subjected to the plasma processing. Hence, the urethane resin film having been subjected to the plasma processing can have decreased in crosslinking density in the depth direction from the surface, and can be the surface layer that fulfills the above conditions (1) to (3).

Here, when the surface of the surface layer formed of the urethane resin film is subjected to plasma processing in the air, any oxygen radicals generated in plasma may excessively cut the urethane linkage of the urethane resin film to make the film have a low crosslinking density. Accordingly, it is preferable to subject the urethane resin film to the plasma processing in an atmosphere of nitrogen, stated specifically, e.g., in an atmosphere of 95 vol. % or more of nitrogen. According to such plasma processing, the surface of the urethane resin film can be kept from being oxidized. As the result, a surface layer can be obtained in which the ratio of carbon atoms to oxygen atoms (O/C atomic ratio) at the surface is within the range of 0.8 time to 1.1 times the O/C atomic ratio in the region of from 200 nm to 300 nm in depth from the surface; the region being little influenced by the plasma processing. More specifically, where the average value of the O/C atomic ratio in the region of up to 100 nm in depth from the surface of the surface layer is represented by O1, and the average value of the O/C atomic ratio in the region of from 200 nm to 300 nm in depth from the surface of the surface layer by O3, the surface layer can be one having the relationship of O1 and O3 which are shown by the following relational expression:

$$O3\times0.8\leqq O1\leqq O3\times1.1.$$

In addition, in the case when as described above the urethane resin film is so subjected to plasma processing as to be kept from its surface oxidation, the value of O1 may be made within a numerical value of from 0.27 or more to 0.44 or less. That is, even when the urethane resin film is subjected to the plasma processing, oxygen atoms can be avoided being introduced in a large quantity to its surface. Hence, the surface layer can be avoided acquiring any excess charge-providing ability to the developer, which may come about when the surface layer contains oxygen atoms in a large quantity.

As being what is stated above, it is preferable for the electrophotographic developing member 10 according to the present invention to fulfill the following conditions (4) and (5):

$$O3\times0.8\leqq O1\leqq O3\times1.1;\text{ and} \quad \text{(condition (4))}$$

$$0.27\leqq O1\leqq 0.44. \quad \text{(condition (5))}$$

In the above conditions (4) and (5) and the condition (7) below, O1, O2 and O3 each represent the average O/C atomic ratio in each region of up to 100 nm in depth, from 100 nm to 200 nm in depth and from 200 nm to 300 nm in depth, respectively, from the surface of the surface layer. As long as the O1 is 0.8 time to 1.1 times the O3, the surface layer can readily be kept from being low in crosslinking density. Also, as long as the O1 is 0.27 or more, the surface layer can readily acquire charge-providing performance to the developer, and as long as the O1 is 0.44 or less, the surface layer can readily have uniform charge-providing performance to the developer.

Further, as a more limitation to the above expression (2), it is more preferable to satisfy the value of $C3\times1.5\leqq C1\leqq C3\times3.0$ (condition (6)). As long as the C1 is 1.5 times or more the C3, the surface layer can more readily be kept from being deformed by its contacting members. As long as the C1 is 3.0 times or less the C3, the surface layer can more readily be kept from the sticking of a developer.

It is also preferable to satisfy the value of $O1\leqq O2\leqq O3$ (condition (7)). Changing the average O/C atomic ratio continuously from the surface of the surface layer enables the surface layer to be kept from being large in its oxygen quantity because of the plasma processing, thus the crosslinking density can be controlled within the stated range with ease.

Embodiments of the present invention are described below in detail with reference to the drawings, by which embodiments, however, the present invention is by no means limited.

Electrophotographic Developing Member

The electrophotographic developing member according to the present invention is most basically constituted of the mandrel and the surface layer containing a urethane resin, provided on the peripheral surface of the mandrel. It may also be so constituted that the surface layer is formed on a resin layer having a desired elasticity, formed on the peripheral surface of the mandrel, and this is also included in the scope of the present invention. In such constitution, the resin layer may also be a multi-layer.

Figure 1B:
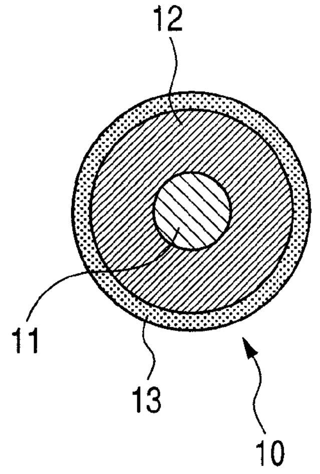
Figure 2A:
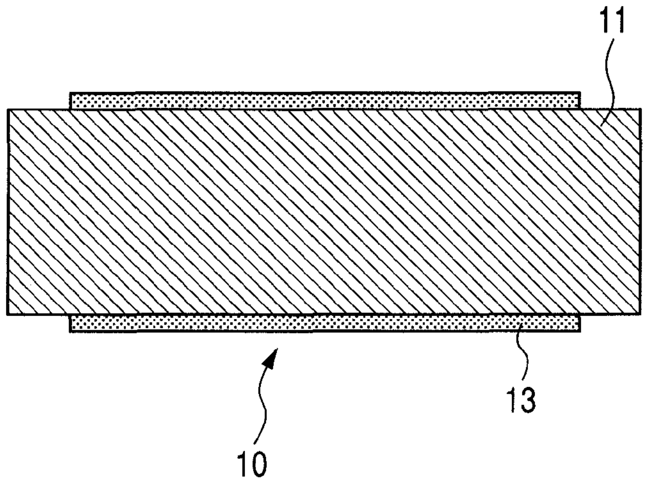
FIGS. 2A and 2B show another example of the electrophotographic developing member of the present invention, where
Figure 2B:
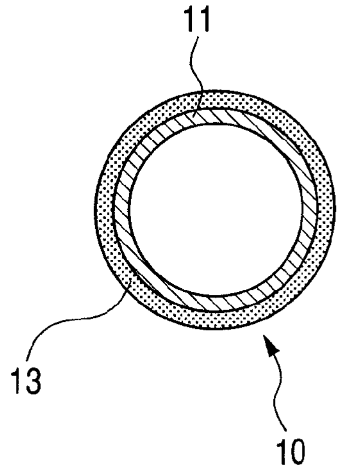

Examples of the electrophotographic developing member according to the present invention are shown in FIGS. 1A and 1B and FIGS. 2A and 2B. FIGS. 1A and 2A in FIGS. 1A and 1B and FIGS. 2A and 2B are views each showing a section parallel to the lengthwise direction of the electrophotographic developing member, and FIGS. 1B and 2B are views each showing a section perpendicular to the lengthwise direction of the electrophotographic developing member. In what is shown in FIGS. 1A and 1B, an electrophotographic developing member 10 has a cylindrical mandrel 11 on the peripheral surface of which a resin layer 12 and a surface layer 13 are formed as cover layers. In what is shown in FIGS. 2A and 2B, an electrophotographic developing member 10 has a cylindrical mandrel 11 on the peripheral surface of which only a surface layer 13 is formed as a cover layer.

The electrophotographic developing member shown in FIGS. 1A and 1B is described below in detail.

Materials for the mandrel 11 are not particularly limited as long as they are electrically conductive, and may be used under appropriate selection from among carbon steel, alloy steel, cast iron and conductive resins. Here, the alloy steel may include stainless steel, nickel chromium steel, nickel chromium molybdenum steel, chromium steel, chromium molybdenum steel, and nitriding steel to which Al, Cr, Mo and V have been added.

Further, as a measure for rust prevention, the mandrel material may be subjected to plating or oxidizing treatment. The plating may include, as types thereof, electroplating and electroless plating, either of which may be used. The electroless plating is preferred from the viewpoint of dimensional stability. The electroless plating usable here may include, as types thereof, nickel plating, copper plating, gold plating, Kanigen plating, and other alloy plating of various types. The nickel plating may include, as types thereof, Ni—P, Ni—B, Ni—W—P or Ni—P-PTFE composite plating. Each plating may preferably be in a layer thickness of 0.05 μm or more, and more preferably from 0.10 μm to 30.00 μm.

As materials for the resin layer 12, usable are natural rubber, isoprene rubber, styrene rubber, butyl rubber, butadiene rubber, fluororubber, urethane rubber and silicone rubber. Any of these may be used alone or in combination of two or more types. Further, a foam of any of these materials may also be used.

The resin layer 12 may preferably be in a thickness of from 0.5 mm to 10.0 mm in order to provide the electrophotographic developing member 10 with a sufficient elasticity. Inasmuch as the resin layer 12 is formed in a thickness of 0.5 mm or more, the electrophotographic developing member 10 can have a sufficient elasticity and the photosensitive drum can be kept from wearing. Also, inasmuch as the resin layer 12 is formed in a thickness of 10.0 mm or less, the electrophotographic developing member 10 can promise the reduction of cost.

The resin layer 12 may preferably have an Asker-C hardness of from 10 degrees to 80 degrees. Inasmuch as the resin layer 12 has an Asker-C hardness of 10 degrees or more, any oil component can be kept from soaking out of the rubber material making up the resin layer 12, and can keep the photosensitive drum from being stained. Also, inasmuch as the resin layer 12 has an Asker-C hardness of 80 degrees or less, the photosensitive drum can be kept from wearing.

To the resin layer 12, a filler may be added as long as it does not damage characteristics of low hardness and low compression set. Materials for the filler may include fine quartz powder, fumed silica, wet-process silica, diatomaceous earth, zinc oxide, basic magnesium carbonate, activated calcium carbonate, magnesium silicate, aluminum silicate, titanium dioxide, talc, mica powder, aluminum sulfate, calcium sulfate, barium sulfate, glass fiber, organic reinforcing agents, and organic fillers. Particle surfaces of these fillers may be treated with an organosilicon compound, e.g., polydiorganosiloxane to make them hydrophobic.

The electrophotographic developing member 10 must have electrical resistance value of a semiconductor region. Accordingly, it is preferable that the resin layer 12 contains a conducting agent and is formed of a rubber material having a volume resistivity of from $1\times10^4$ Ω·cm to $1\times10^{10}$ Ω·cm. Here, as long as the resin layer material has the volume resistivity of from $1\times10^4$ Ω·cm to $1\times10^{10}$ Ω·cm, it can achieve a uniform charge controllability for the developer. Further, it is more preferable for that material to have a volume resistivity of from $1\times10^4$ Ω·cm to $1\times10^9$ Ω·cm.

As a means for making the material of the resin layer 12 electrically conductive, a method is available in which a conductivity-providing agent that acts by the mechanism of ion conduction or the mechanism of electron conduction is added to the material to make it electrically conductive.

The conductivity-providing agent that acts by the mechanism of ion conduction may include the following: Salts of Group 1 metals of the periodic table, such as $LiCF_3SO_3$, $NaClO_4$, $LiClO_4$, $LiAsF_6$, $LiBF_4$, NaSCN, KSCN and NaCl; ammonium salts such as $NH_4Cl$, $(NH_4)_2SO_4$ and $NH_4NO_3$; salts of Group 2 metals of the periodic table, such as $Ca(ClO_4)_2$ and $Ba(ClO_4)_2$; complexes of any of these salts with a polyhydric alcohol such as 1,4-butanediol, ethylene glycol, polyethylene glycol, propylene glycol or polypropylene glycol or with a derivatives of any of these; complexes of any of these salts with a monool such as ethylene glycol monomethyl ether, ethylene glycol monoethyl ether, polyethylene glycol monomethyl ether or polyethylene glycol monoethyl ether; cationic surface-active agents such as quaternary ammonium salts; anionic surface-active agents such as aliphatic sulfonates, alkyl sulfuric ester salts and alkyl phosphoric ester salts; and amphoteric surface-active agents such as betaine.

The conductivity-providing agent that acts by the mechanism of electron conduction may also include the following: Carbon type materials such as carbon black and graphite; metals or alloys, such as aluminum, silver, gold, a tin-lead alloy and a copper-nickel alloy; metal oxides such as zinc oxide, titanium oxide, aluminum oxide, tin oxide, antimony oxide, indium oxide and silver oxide; and materials obtained by subjecting fillers of various types to conductive metal plating of copper, nickel or silver.

Any of these conductivity-providing agents that act by the mechanism of ion conduction or the mechanism of electron conduction may be used alone or in combination of two or more types, in the form of powder or fiber. Of these, carbon black is preferred from the viewpoint of promising easy control of conductivity and being economical.

The volume resistivity of the resin layer material may be measured by the following method.

First, the material of the resin layer 12 is cured under the same conditions as those in molding the resin layer 12 and in the same thickness as the resin layer 12 to prepare a flat-plate-shaped test piece. Next, from this test piece, a test piece of 30 mm in diameter is cut out. The test piece thus cut out is provided on one side thereof with a vacuum-deposited film electrode (back electrode) by Pt—Pd vacuum deposition over its whole surface, and is provided on the other side thereof with a main-electrode film of 15 mm in diameter and a guard-ring electrode film of 18 mm in inner diameter and 28 mm in outer diameter in a concentric form by likewise forming Pt—Pd vacuum-deposited films. Here, the Pt—Pd vacuum-deposited films are obtained by operating vacuum deposition for 2 minutes at a current value of 15 mA, using MILDSPUTTER E1030 (trade name; manufactured by Hitachi Ltd.). The test piece on which the operation of vacuum deposition has been completed is used as a measuring sample.

Next, the following instrument is used to measure the volume resistance of the measuring sample under the following conditions. In measuring it, a main electrode is so placed as not to protrude from the main-electrode film. A guard-ring electrode is also so placed as not to protrude from the guard-ring electrode film. Measured in an environment of temperature 23° C. and humidity 50% RH, where, before the measurement, the measuring sample is kept left to stand in that environment for 12 hours or more.

Sample box: Sample Box TR42 for ultra-high resistance measurement (trade name; manufactured by Advantest Co., Ltd.).

Main electrode: Metal of 10 mm in bore diameter and 10 mm in thickness.

Guard-ring electrode: Metal of 10 mm in inner diameter, 26 mm in outer diameter and 10 mm in thickness.

Resistance meter: Ultra-high resistance meter R8340A (trade name; manufactured by Advantest Co., Ltd.).

Measuring mode: Program mode 5 (charging and measuring for 30 seconds, and discharging for 10 seconds. Applied voltage: 100 V.

Where the volume resistance value thus measured is represented by RM (Ω), and the thickness of the test piece by t (cm), the volume resistivity RR(Ω·cm) of the resin layer material may be determined according to the following expression.

$$RR(\Omega\cdot\text{cm})=\pi\times 0.75\times 0.75\times RM(\Omega)/[4\times t(\text{cm})].$$

Surface Layer 13

The surface layer 13 is the layer that may fulfill the above conditions (1) to (3), preferably the above conditions (1) to (5), and particularly preferably the above conditions (1) to (7). As a constituent material for such a surface layer 13, it is preferable to use the urethane resin that is a nitrogen-containing compound. This is because the developer can stably electrostatically be charged. In the present invention, as a binder resin of the surface layer 13, it is more preferable for the resin to be composed of a urethane resin obtained by reacting an isocyanate compound with a polyol.

The isocyanate compound may include the following: Diphenylmethane-4,4'-diisocyanate, 1,5-naphthalene diisocyanate, 3,3'-dimethylbiphenyl-4,4'-diisocyanate, 4,4'-dicyclohexylmethane diisocyanate, p-phenylene diisocyanate, isophorone diisocyanate, carbodimide modified MDI, xylylene diisocyanate, trimethylhexamethylene diisocyanate, tolylene diisocyanate, naphthylene diisocyanate, paraphenylene diisocyanate, hexamethylene diisocyanate, and polymethylene polyphenyl polyisocyanate. A mixture of any of these may be used, where their mixing proportion may be of any proportion.

The polyol may include the following: As dihydric polyols (diols), ethylene glycol, diethylene glycol, propylene glycol, dipropylene glycol, 1,4-butanediol, hexanediol, neopentyl glycol, 1,4-cyclohexanediol, 1,4-cyclohexanedimethanol, xylene glycol, and triethylene glycol; as trihydric or higher polyols, 1,1,1-trimethylolpropane, glycerol, pentaerythritol, and sorbitol; and further polyols such as high molecular weight polyethylene glycols obtained by the addition of ethylene oxide or propylene oxide to diols or triols, polypropylene glycol, ethylene oxide-propylene oxide block glycol; any of which may be used. A mixture of any of these may be used, where their mixing proportion may be of any proportion.

Further, the surface layer 13 may be used in the state it is provided with electrical conductivity. As a method for providing it with electrical conductivity, a method may be used which is the same as that for making the above resin layer 12 electrically conductive.

The surface layer 13 may preferably have a thickness of from 1.0 μm to 500.0 μm. Further, the surface layer 13 may more preferably have a thickness of from 1.0 μm to 50.0 μm. Inasmuch as the surface layer 13 is in a thickness of 1.0 μm or more, it can be provided with durability. Also, inasmuch as it is in a thickness of 500.0 μm or less, and further preferably 50.0 μm or less, it can have a low MD-1 hardness and can be kept from the sticking of a developer.

The MD-1 hardness of the electrophotographic developing member 10 is measured by using a rubber microhardness meter (MD-1 capa Type A, trade name; manufactured by Kobunshi Keiki Co., Ltd.) in a peak-hold mode, and in a room controlled to a temperature of 23° C. and a humidity of 50% RH. In the present invention, the electrophotographic developing member 10 may have an MD-1 hardness of from 25.0° or more to 40.0° or less, and this is preferable because it can effectively be kept from the sticking of a developer and be kept from being deformed by its contacting members. It may more preferably have an MD-1 hardness of from 32.0° or more to 38° or less.

The surface roughness of the electrophotographic developing member 10 has a great influence on its developer transport power. Accordingly, it is preferable for the developing member to have a center-line average roughness Ra of from 0.05 μm to 3.00 μm according to the standard of surface roughness that is prescribed in Japan Industrial Standard (JIS) B0601:1994. Inasmuch as it has an Ra of 0.05 μm or more, it can have the developer transport power and can keep any lowering of image density from occurring or any lowering of image quality such as ghost from occurring. Also, inasmuch as it has an Ra of 3.00 μm or less, it can keep any lowering of image quality such as fog or coarse images from occurring.

As a means for controlling the surface roughness, it is effective to incorporate the surface layer 13 with particles having a desired particle diameter. Instead, before or after the surface layer is or has been formed, appropriate sanding may be carried out so that it may be formed in the desired surface roughness. In such a case, where only the surface layer is formed, the surface layer may be subjected to sanding after its formation. Where only the surface layer is formed in a plurality of layers, it may be subjected to sanding after some layer(s) of the plurality of layers has/have been formed, or may be subjected to sanding after all layers of the plurality of layers have been formed. Also, where the resin layer and the surface layer are formed, the resin layer may be subjected to sanding after its formation or the surface layer may be subjected to sanding after its formation.

As the particles to be incorporated in the surface layer 13, metal particles or resin particles may be used which are 0.1 to 30.0 μm in particle diameter. In particular, resin particles are preferred as having a rich flexibility, having a relatively small specific gravity and achievable of stability of coating materials. Such resin particles may include urethane resin particles, nylon resin particles, acrylic resin particles and silicone resin particles. Any of these resin particles may be used alone or in the form of a mixture of a plurality of types. Where the surface layer is formed in a plurality of layers, the particles may be incorporated in all layers of the plurality of layers, or the particles may be incorporated in at least one layer of the plurality of layers.

In the present invention, it is preferable that, after the surface layer having an average crosslinking density of from $2.0\times10^{-4}$ mol/cm$^3$ or more to $7.0\times10^{-4}$ mol/cm$^3$ or less has been formed, it is subjected to plasma processing under atmospheric pressure. As long as the surface layer 13 has an average crosslinking density of $2.0\times10^{-4}$ mol/cm$^3$ or more, it can readily be kept from having a low crosslinking density as a result of the plasma processing. As long as it has an average crosslinking density of $7.0\times10^{-4}$ mol/cm$^3$ or less, it can readily be kept from the sticking of a developer to the surface layer having been subjected to plasma processing. Where the surface layer is formed in a plurality of layers, it is preferable that the surface layer positioned at the outer-most surface has the average crosslinking density within the above range, which may more preferably be within the range of from $3.0\times10^{-4}$ mol/cm$^3$ or more to $5.0\times10^{-4}$ mol/cm$^3$ or less.

In order to materialize such preferable crosslinking density, it is preferable for the surface layer 13 to contain as a chief component the following binder resin. It is a binder resin obtained by mixing as a polyol a polyurethane prepolymer having a weight average molecular weight of from 4,000 or more to 11,000 or less and an isocyanate in a proportion of from 1.1 or more to 1.5 or less as NCO equivalent weight, and allowing them to react with each other. Stated specifically, a polyurethane prepolymer terminated with a hydroxyl group may be used as the polyurethane prepolymer, and a blocked isocyanate may be used as the isocyanate.

The NCO equivalent weight shows the ratio of the number of moles of isocyanate groups in the isocyanate compound to the number of moles of hydroxyl groups in the polyol component, i.e., [NCO]/[OH]. Where the surface layer is formed in a plurality of layers, it is preferable that the surface layer positioned at the outer-most surface is incorporated with the above binder resin.

It is preferable that, after a surface layer having an average O/C atomic ratio within the range of from 0.25 or more to 0.55 or less has been formed, it is subjected to plasma processing under atmospheric pressure. As long as it has an average O/C atomic ratio of 0.25 or more, the surface layer having been subjected to plasma processing can easily obtain charge-providing performance to the developer. As long as it has an average O/C atomic ratio of 0.55 or less, the surface layer having been subjected to plasma processing can readily have uniform charge-providing performance to the developer. Where the surface layer is formed in a plurality of layers, it is preferable that the surface layer positioned at the outer-most surface has the average O/C atomic ratio within the above range, which may more preferably be within the range of from 0.28 or more to 0.40 or less.

The electrophotographic developing member of the present invention may favorably be produced by forming on the peripheral surface of the mandrel the cured film of a raw-material solution for forming the surface layer, and thereafter subjecting it to the plasma processing under atmospheric pressure.

Atmospheric-Pressure Plasma Processing

About a system used in atmospheric-pressure plasma processing that is applicable to the present invention, its outline is described with reference to FIG. 3.

Figure 3:
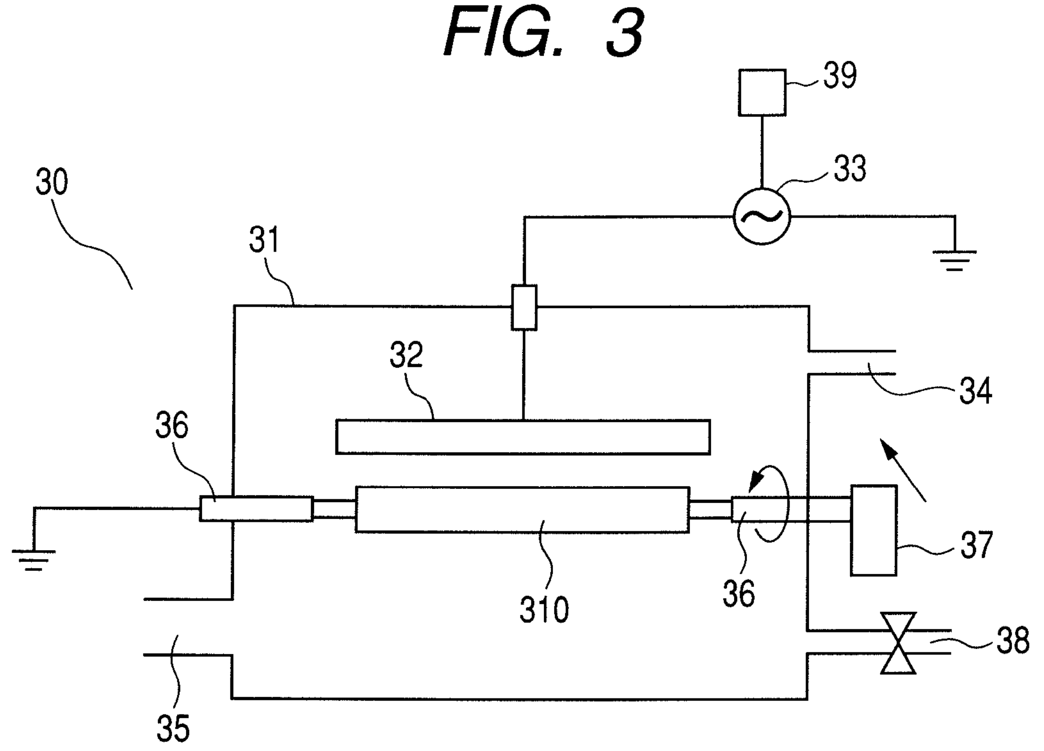
FIG. 3 is a schematic structural view of an atmospheric-pressure plasma processing system.

FIG. 3 is a schematic structural view showing an example of an atmospheric-pressure plasma processing system which materializes a process for producing the electrophotographic developing member of the present invention. An atmospheric-pressure plasma processing system 30 shown in FIG. 3 is constituted of a chamber 31, a plasma electrode 32, a high-frequency power source 33, a gas feed inlet 34, a gas discharge outlet 35 and a pulse generator 39. As an example of the atmospheric-pressure plasma processing system, it may include a corona discharge surface processing system (manufactured by Kasuga Electric Works Ltd.).

What is to be subjected to the atmospheric-pressure plasma processing (hereinafter also "processing object 310") made up of a mandrel, an elastic layer formed on the peripheral surface of the mandrel and a urethane resin film which covers the surface of the elastic layer is supported at both ends of the mandrel by means of a support 36 set inside the chamber 31, and is disposed in parallel to the electrode, leaving a desired distance between them. Further, the mandrel of the processing object 310 is grounded through the support 36, and is connected to a rotating drive 37.

The plasma electrode 32 stands electrically insulated from the chamber 31, and is further connected with the high-frequency power source 33, which outputs high-frequency power with a desired frequency. To the high-frequency power source 33, the pulse generator 39 is connected, and can pulse-modulate the high-frequency power as occasion calls. In the plasma electrode 32, one constituted of a metallic conductor through which the high-frequency power is to be fed and a ceramic with which the peripheral surface of the former is covered may preferably be used in order to keep any sparks from being produced.

The gas feed inlet 34 is also connected to a gas cylinder (not shown) through a regulator in order to bring the interior of the chamber 31 into a desired gas atmosphere, and further the gas discharge outlet 35 is connected to a vacuum pump (not shown). A purge opening 38 is also provided which is to purge the interior of the chamber 31.

How the plasma processing system operates is described next.

First, the processing object 310 is placed at the desired position. Where the interior of the chamber is controlled to have the desired atmosphere, the vacuum pump is operated to evacuate the interior of the chamber 31 through the gas discharge outlet 35. At the time the chamber has come to have a desired degree of vacuum, the evacuation is stopped, where the desired gas is fed through the gas feed inlet 34. At the time the interior of the chamber 31 has come to have atmospheric pressure, the gas feeding is stopped.

Next, the processing object 310 is rotatingly driven. Thereafter, the desired high-frequency power is supplied to the plasma electrode 32 from the high-frequency power source 33 to generate plasma between the processing object 310 and the plasma electrode 32 to start the processing. Upon lapse of a desired processing time, the supply of electric power and the rotational driving are stopped to complete the processing to obtain the electrophotographic developing member 10.

The plasma processing time and the plasma generating conditions may be so selected that the surface layer obtained through the plasma processing may fulfill the above conditions (1) to (3).

As the plasma processing time, the processing time may preferably be, stated specifically, from 1 second to 30 seconds. Setting it to 1 second or more is preferable because this can bring an effect of uniform processing in the peripheral direction. Setting it to 30 seconds or less is also preferable because this can keep the crosslinking density from lowering because of any excess temperature rise due to plasma.

As the pressure in the interior of the chamber 31 in generating the plasma, the plasma may preferably be formed under an atmospheric-pressure neighborhood of from Pa to 111,000 Pa to carry out processing, in order to enhance the density of charged particles in the plasma to carry out the processing in a good efficiency.

The high-frequency power to be supplied to the plasma electrode 32 may preferably be supplied under appropriate selection of frequency and supply power according to the pressure in the interior of the chamber. Stated specifically, a frequency of from 1 kHz to 3 GHz is preferred. Especially where the plasma is generated under atmospheric pressure, a frequency of from 1 kHz to 15 MHz is preferred and a frequency of from 5 kHz to 100 kHz is further preferred, because the plasma can stably be formed. The supply power depends on how the system is set up and the region where the plasma is generated, and there are no particular limitations thereon. It may preferably be set higher as long as any sparks are not produced and any excess temperature rise of the developing member comes about, because the processing can be made in a good efficiency.

In the present invention, it is preferable that a high-frequency power pulse-modulated by a pulse width modulation method is supplied to generate the plasma. The use of such a pulse width modulation method enables well efficient control of the power supplied for plasma to enable easy control of the crosslinking density. The high-frequency power may also preferably be in a duty ratio within the range of from 50% or more to 80% or less. The duty ratio refers to the ratio of the time for which the powder is supplied, to one period of the pulse-modulated high-frequency power. Inasmuch as the duty ratio is 50% or more, sufficient energy to increase the crosslinking density can be applied. Also, inasmuch as the duty ratio is 80% or less, the crosslinking density can keep from lowering because of any excess temperature rise due to plasma. The high-frequency power may more preferably be in a duty ratio within the range of from 60% or more to 75% or less.

As to distance between the plasma electrode 32 and the electrophotographic developing member 10, there are no particular limitations thereon as long as it is substantially uniform in the lengthwise direction. It may be selected within a proper range in accordance with power source frequency used, and may commonly preferably be a distance of from 1 mm to 10 mm. Inasmuch as it is 1 mm or more, any sparks can be kept from being produced, desirably. Also, inasmuch as it is 10 mm or less, the plasma can uniformly be formed, desirably.

Further, in the present invention, the level of nitrogen in the interior of the chamber 31 may be controlled to carry out plasma processing. The interior of the chamber 31 may be first evacuated and then nitrogen gas may be fed thereinto, whereby the nitrogen level in the interior of the chamber 31 may be controlled. The nitrogen level may also be controlled without any evacuation, by feeding the nitrogen gas to the plasma zone at a specific flow rate or above. In any case, the nitrogen level in the atmosphere of the plasma zone at least may be kept controlled. In controlling the nitrogen level in the atmosphere of the plasma zone, such atmosphere may preferably be kept at 95 vol. % or more of nitrogen. Inasmuch as it is kept at 95 vol. % or more of nitrogen, the surface can be kept from being oxidized and the crosslinking density can be kept from lowering. The atmosphere may more preferably be kept at 98 vol. % or more of nitrogen.

Figure 4A:
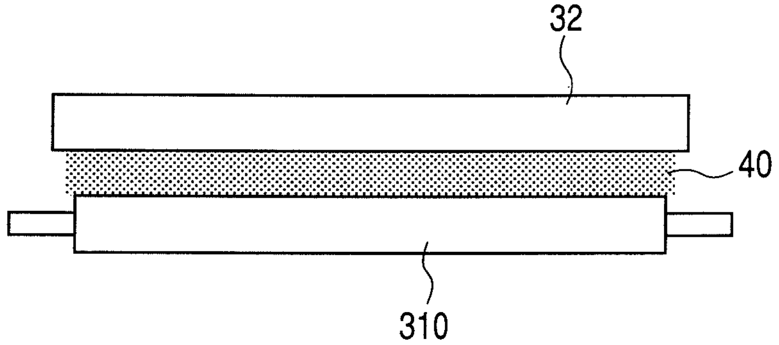
FIGS. 4A and 4B are each a schematic view to illustrate a plasma-generating zone with respect to the lengthwise direction of a plasma processing member, in the atmospheric-pressure plasma processing system.
Figure 4B:
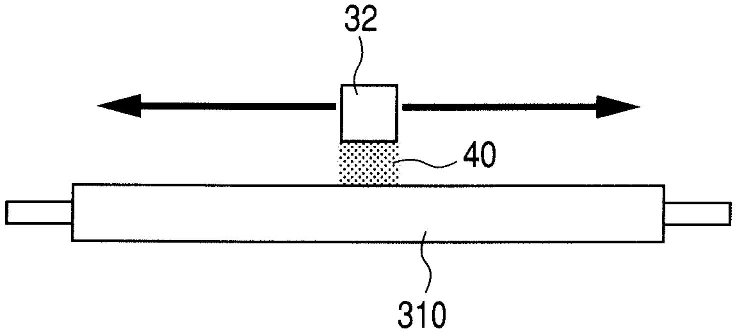

The plasma generating zone may arbitrarily be controlled by how the system is set up. In the plasma processing system 30 shown in FIG. 3, as shown in FIG. 4A, plasma 40 may be formed over the whole, area of the processing object 310 in its axial direction to carry out plasma processing. Instead, plasma 40 formed locally as shown in FIG. 4B may be traversed over the processing object 310 in its lengthwise direction shown by an arrow so as to carry out plasma processing of the electrophotographic developing member 10 over the whole area in its axial direction. As an example of the plasma processing system which generates such plasma as that shown in FIG. 4B, it may include a plasma irradiation surface modifying system (trade name: PS-601C; manufactured by Kasuga Electric Works Ltd.).

During the plasma processing, the processing object 310 may preferably be rotated so as to carry out plasma processing uniformly in its peripheral direction. As to the number of revolutions of the electrophotographic developing member 10, there are no particular limitations thereon, which may preferably be a number of revolutions of from 1 rpm to 300 rpm as being achievable of uniform processing.

Carrying out the plasma processing as described above enables production of the electrophotographic developing member in which the crosslinking density and O/C atomic ratio in the vicinity of the surface of the electrophotographic developing member 10 have been controlled within the range of the present invention.

An example of a specific method by which the crosslinking density and O/C atomic ratio in the vicinity of the surface of the electrophotographic developing member can be controlled within the range of the present invention is described below.

First, to produce the urethane resin film to be subjected to the plasma processing, its average crosslinking density is so controlled as to be within the range of from $2.0\times10^{-4}$ mol/cm$^3$ or more to $7.0\times10^{-4}$ mol/cm$^3$ or less (condition (3)). This control may be made by selecting the raw material for the urethane resin film or adjusting curing conditions in producing the urethane resin film. Here, the average O/C atomic ratio of the urethane resin film is also measured.

Next, conditions for generating the plasma are determined. In particular, the supply power and the nitrogen level in the chamber are so determined that any lowering of the crosslinking density may not come and the average O/C atomic ratio in the vicinity of the surface after the plasma processing may fulfill the conditions (4) and (5). Then, the plasma processing is so carried out that the average crosslinking density in the region of up to 100 nm from the surface may be 1.3 to 5.0 times that before the plasma processing (condition (2)), and preferably 1.5 to 3.0 times the same (condition (6)), and may fulfill the condition (1) and also optionally the conditions (7).

Thus, the crosslinking density and O/C atomic ratio in the vicinity of the surface of the electrophotographic developing member can be controlled within the range of the present invention.

Electrophotographic Process Cartridge and Electrophotographic Image Forming Apparatus An example of the electrophotographic process cartridge, and an example of the electrophotographic image forming apparatus, to which the electrophotographic developing member of the present invention is mounted are described next with reference to FIG. 5. The electrophotographic image forming apparatus of the present invention has at least a photosensitive member for forming thereon an electrostatic latent image and the electrophotographic developing member. The electrophotographic process cartridge of the present invention has at least a photosensitive member for forming thereon an electrostatic latent image and the electrophotographic developing member, and is so constituted as to be detachably mountable to the main body of an electrophotographic image forming apparatus.

Figure 5:
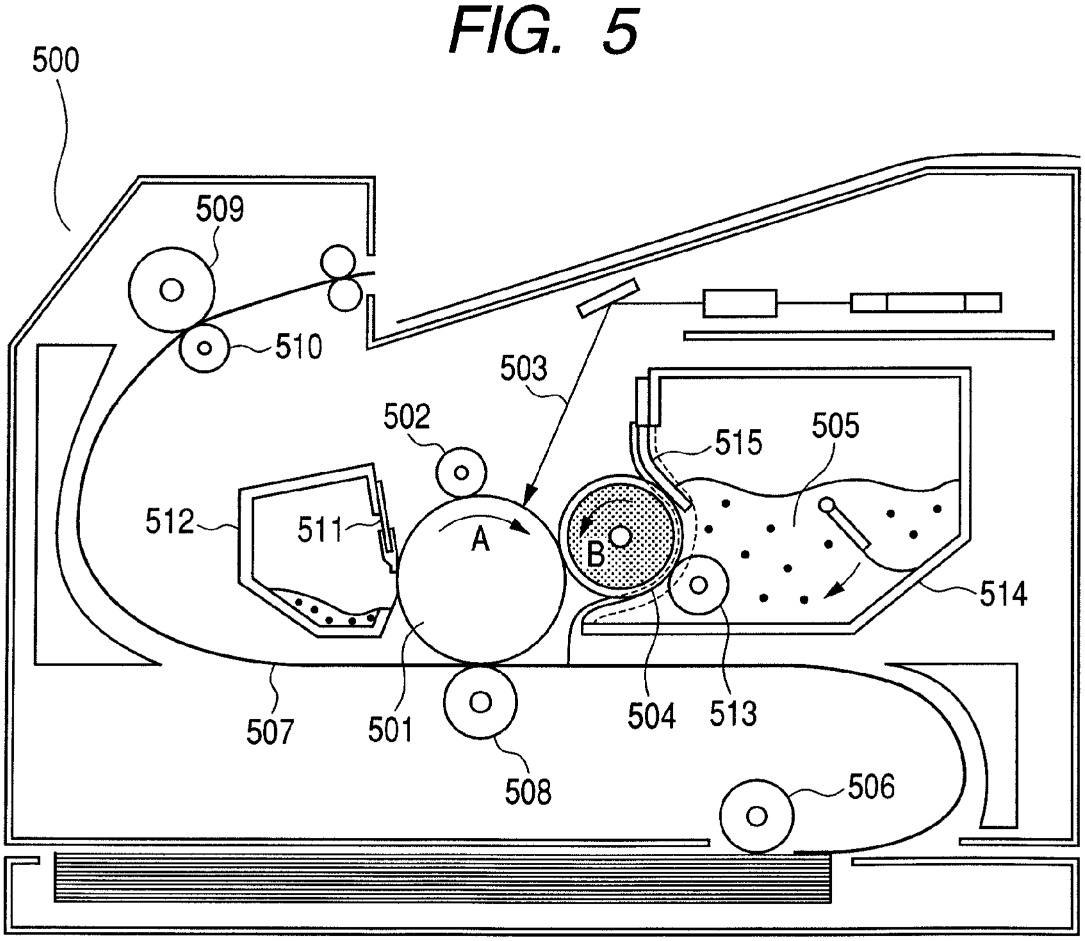
FIG. 5 is a schematic structural view showing an example of the electrophotographic process cartridge and electrophotographic image forming apparatus according to the present invention.

An electrophotographic image forming apparatus 500 according to the present invention is constituted of various members for electrophotography which are disposed as shown in FIG. 5. A photosensitive drum 501 is, against its surface, electrostatically charged by means of a charging roller 502 so as to have uniform potential at a stated polarity. Thereafter, on the surface of the photosensitive drum 501, an electrostatic latent image corresponding to an intended image is formed by exposure light 503 modulated with intended image information. This electrostatic latent image is rendered visible as a developer image by a developer 505 fed by a developing roller 504 that is the electrophotographic developing member according to the present invention. A developer feed roller 513 and a developing blade 515 are each kept in contact with the developing roller 504 so that the developer may be fed to its surface from a developer tank 514 by the developer feed roller 513 and may come uniform in thickness by the aid of the developing blade 515. The developer held on the developing roller 504 but having remained on the developing roller 504 without being used when the electrostatic latent image is developed is first scraped off the developing roller 504 with the developer feed roller 513.

The developer image as an image rendered visible is transferred to a recording material 507 while voltage is applied to the recording material 507 from its back through a transfer roller 508; the recording material being transported by a paper feed roller 506. The recording material 507 to which the developer image has been transferred is transported to a fixing zone constituted of a fixing roller 509 and a pressure roller 510, and is imagewise fixed, thus the fixed image is outputted as an image-formed matter. The photosensitive drum 501 is cleaned by a cleaning member 511 in order to remove the developer remaining thereon, then charge-eliminated by a charge-eliminating member (not shown), and is again put to the charging step. The developer removed by the cleaning member 511 is collected in a waste developer container 512. A cleaning roller may also be used as the cleaning member 511.

To the charging roller 502, the developing roller 504 and the transfer roller 508, a necessary voltage is kept applied by a bias applying power source.

The electrophotographic process cartridge is constituted of at least the photosensitive drum and the electrophotographic developing member which are exchangeable for new ones in an integral form, and is so constituted as to be detachably mountable to the main body of the electrophotographic image forming apparatus. Excluding the fixing zone, the electrophotographic process cartridge may also have, besides the above, the charging member and the cleaning member in an integral form.

Then, electrophotographic process cartridges for four colors of black, magenta, cyan and yellow may be arranged, and their respective developer images formed correspondingly may be transferred to a recording material and imagewise fixed thereto, thus a color image-formed matter can be outputted. Instead of the developing roller 504, a developing sleeve may also be used.

How to Measure Parameters

Measurement of Average Crosslinking Density

The average crosslinking density in the vicinity of the surface of the electrophotographic developing member of the present invention is determined by a micro-sampling mass spectrometry and a swelling method in combination. More specifically, the average crosslinking density may commonly be determined by a swelling method described later. However, as to the C1, C2 and C3 according to the present invention, it is difficult to determine the average crosslinking density by using the swelling method, because the surface layer to be sampled is very thin which is as small as 100 nm in thickness. Accordingly, in the present invention, the micro-sampling method is used in combination.

An outline of the micro-sampling mass spectrometry is shown below.

First, the surface portion of the developing member to be measured is cut with a microtome to cut out thin pieces to ready samples. In the present invention, thin pieces of 100 μm square and 100 nm in thickness are prepared from each region of up to 100 nm in depth, from 100 nm to 200 nm in depth and from 200 nm to 300 nm in depth from the surface.

For the measurement, an ion trap type MS instrument is used which is mounted to POLARIS Q (trade name; manufactured by Thermo Electron Corporation). Each sample is fastened to a filament positioned at the tip of a probe, and inserted directly into an ionizing chamber. Thereafter, the sample is rapidly heated from room temperature up to a temperature of 1,000° C. at a constant heating rate. The sample having vaporized is ionized by irradiation with electron beams to make detection with a mass spectrometer.

At this point, under conditions of a constant heating rate, a thermochromatogram is obtained which is similar to that in a TG-MS (thermogravimetry-mass spectrometry) method and has a mass spectrum called a total ion chromatogram (TIC). The temperature at which the thermochromatogram comes to the maximum value, i.e., peak temperature shows a very good correlation with the average crosslinking density of the sample. Accordingly, test pieces of urethane resin cured products different in crosslinking density which are each composed of a raw-material solution of the surface layer are readied in plurality, and the average crosslinking density of these is beforehand determined by using the swelling method described later. Next, about each of the test pieces, the peak temperature is determined by using the above micro-sampling method. Thus, a relational expression is obtained which shows the correlation between the peak temperature and the average crosslinking density. On the basis of this relational expression and from the peak temperature of the thin piece prepared from each thickness region of the surface layer, the average crosslinking density of that thickness region may be determined.

How to calculate the average crosslinking density by the swelling method is as follows.

The raw-material solution of the surface layer is cured to prepare a plurality of test pieces of 10 mm×10 mm and 10 μm in thickness which are composed of the urethane resin cured product. These test pieces are immersed in toluene for 72 hours to make them soak and swell, followed by drying at room temperature for 48 hours. Then, about each test piece, its weight W(g) and specific gravity p (g/cm$^3$) are measured where it stands at the initial stage (before swelling), at the soaking and swelling and after the drying each. From the measurements obtained, the average crosslinking density ν (mol/cm$^3$) of each test piece is calculated according to the expression shown below. The mass and density are measured with a dry-process automatic density meter AccuPyc 1330 (trade name; manufactured by Shimadzu Corporation). From the measurements obtained, the average crosslinking density ν (mol/cm$^3$) is calculated according to the following expression.

$$\nu=-(V_0/V_S)[\ln(1-V_r)+V_r+\mu V_r^2]/(V_r^{1/3}V_0^{2/3}-2V_r/4).$$

$W_1$: Initial mass;

$\rho_1$: Initial density;

$W_2$: Mass in a swelling state;

$W_3$: Mass after drying, $\rho_3$: Density after drying;

$\rho_s$: Density (g/cm$^3$) of solvent (toluene) (0.866);

$$V_1=W_1/\rho_1.$$

$$V_2=V_3+(W_2-W_3)/\rho_s V_3=W_3/\rho_3.$$

$V_0$: Volume fraction of network chain polymer in polymer before swelling;

$$V_0=(V_3-V_1P)/(V_1-V_1P)$$

$V_r$: Volume fraction of network chain polymer in a swelling state;

$V_r=(V_3-V_1P)/(V_2-V_1P)$. P: Volume fraction of inorganic filler in the sample (ρ: calculated by inorganic filler=2.2);

$V_s$: Molar volume (cm$^3$) of solvent (toluene) (106.8);

μ: Coefficient of solvent mutual action of polymer (0.413+0.364 Vr); and

ν: Average crosslinking density (mol/cm$^3$)

Measurement of Average O/C Atomic Ratio

The average O/C atomic ratio in the vicinity of the surface of the electrophotographic developing member of the present invention is measured by X-ray photoelectron spectroscopy under the following conditions.

As samples, likewise using a microtome, thin pieces of 100 μm square and 100 nm in thickness are prepared from each region of up to 100 nm in depth, from 100 nm to 200 nm in depth and from 200 nm to 300 nm in depth from the surface. For the measurement, the following instrument is used to determine an average atomic percentage of oxygen atoms (O) and carbon atoms (C), to calculate the average atomic percentage ratio (average O/C atomic ratio) of oxygen atoms (O) to carbon atoms (C).

Instrument: X-ray photoelectron spectrometer ESCALAB 200-X Model (trade name; manufactured by VG Co.).

X-ray source: MgKα (300 W).

Analytical region: 2 mm×3 mm.

EXAMPLES

The present invention is described below in greater detail by giving Examples and Comparative Examples. The following Examples are examples of best embodiments of the present invention, but the present invention is by no means limited by these Examples.

Experiment 1

Examples 1-1 to 1-5 & Comparative Examples 1-1 to 1-3

Production of Developing Rollers Before Atmospheric-Pressure Plasma Processing According to the following procedure, a developing roller was produced which was made up of a cylindrical mandrel and provided on its peripheral surface a resin layer and a surface layer as cover layers in one layer each. As the mandrel, a mandrel was used which was 6 mm in diameter and 279 mm in length, made of SUS 304 stainless steel and plated with nickel on its surface.

As a material for the resin layer, a liquid silicone rubber was readied in the following way. First, the following materials were mixed to prepare a base material for the liquid silicone rubber.

Dimethylpolysiloxane having vinyl groups at both terminals and having a viscosity of 100 Pa·s at a temperature of 25° C.: 100 parts by mass;

Quarts powder as a filler (available from Pennsylvania Glass Sand Corporation; trade name: Min-USil): 7 parts by mass; and Carbon black (available from Tokyo Denki Kagaku Kogyo Kabusiki Kaisha; trade name: DENKA BLACK, a powdery product): 8 parts by mass.

In this base material, one compounded with a trace amount of a platinum compound as a curing catalyst and one compounded with 3 parts by mass of an organohydrogenpolysiloxane were mixed in a mass ratio of 1:1 to make up the liquid silicone rubber.

The mandrel was placed at the center of a cylindrical mold of 12 mm in inner diameter, and this liquid silicone rubber was injected into it through an injection opening, and then heat-cured at a temperature of 120° C. for 5 minutes, followed by cooling to room temperature and thereafter demolding to obtain a resin layer integrated with the mandrel. Further, this layer was heated at a temperature of 200° C. for 4 hours to complete curing reaction, thus a resin layer of 3 mm in thickness, composed chiefly of silicone rubber, was provided on the peripheral surface of the mandrel.

As materials for the surface layer, the following materials were used.

Polytetramethylene glycol (trade name: PTG650SN; number average molecular weight Mn: 1,000, f=2 (f stands for the number of functional groups; the same applies hereinafter); available from Hodogaya Chemical Co., Ltd.): 100.0 parts by mass; and Isocyanate (trade name: MILLIONATE MT, MDI, f=2; available from Nippon Polyurethane Industry Co., Ltd.): 21.2 parts by mass.

These materials were stepwise mixed in a solvent MEK, and reacted with each other at 80° C. in an atmosphere of nitrogen for 6 hours to obtain a bifunctional polyurethane prepolymer having a weight average molecular weight Mw of 10,000, a hydroxyl value of 20.0, a degree of molecular weight dispersion Mw/Mn of 2.9 and Mz/Mw of 2.5. MEK stands for methyl ethyl ketone.

To 100.0 parts by mass of this polyurethane prepolymer, 35.0 parts by mass of an isocyanate (trade name: COLONATE 2521; available from Nippon Polyurethane Industry Co., Ltd.) was added, so as to be in an NCO equivalent weight of 1.4. Further, 16.5 parts by mass of carbon black (trade name: #1000; pH: 3.0; available from Mitsubishi Chemical Corporation) was added. To the raw-material liquid mixture obtained, an organic solvent was added to adjust its solid content appropriately within the range of from 20 to 30% by mass so that a film of about 20 μm in thickness was obtainable. Further, 20.0 parts by mass of urethane resin particles (trade name: C400 Transparent; particle diameter: 14 μm; available from Negami Chemical Industrial Co., Ltd.) was added thereto, and these were uniformly dispersed and mixed to obtain a raw-material solution for the surface layer.

In this raw-material solution for the surface layer, the mandrel with the resin layer formed thereon as above was immersed to form a coating film of the raw-material solution, and thereafter this was drawn up and then dried naturally. Next, this was treated by heating at a temperature of 140° C. for 60 minutes to cure the coating film of the raw-material solution for the surface layer to obtain a urethane resin film of about 20 μm in thickness. At this point, the product was about 12 mm in outer diameter, 235 mm in length of the cover layers, and 1.5 μm in center-line average roughness Ra according to the surface roughness standard of JIS B0601: 1994.

At this point, the average crosslinking density of the urethane resin film as determined by the swelling method was $4.4\times10^{-4}$ mol/cm$^3$. Also, its average O/C atomic ratio measured by the X-ray photoelectron spectroscopy was 0.40.

Calculation of Relational Expression of Peak Temperature and Average Crosslinking Density In the above procedure, only the time of the heat treatment for curing the coating film of the raw-material solution for the surface layer was changed to make different the average crosslinking density of the urethane resin film. Thereafter, both the micro-sampling mass spectrometry and the swelling method were carried out to obtain a relational expression of the peak temperature at which the thermochromatogram determined from the micro-sampling mass spectrometry comes to the maximum value and the average crosslinking density.

The results of evaluation are shown in Table 1. From these results of evaluation, the following relational expression of the peak temperature and the average crosslinking density was obtained.

$$(\text{Average crosslinking density})=0.5367\times(\text{peak temperature})-210.11.$$

In this experiment, this relational expression was used to determine the average crosslinking density from the peak temperature.

TABLE 1

| Heat treatment time | Peak temperature | Average crosslinking density |
|---|---|---|
| 30 minutes | 394.1° C. | $1.5\times10^{-4}$ mol/cc |
| 45 minutes | 395.3° C. | $2.0\times10^{-4}$ mol/cc |
| 60 minutes | 399.8° C. | $4.4\times10^{-4}$ mol/cc |
| 90 minutes | 403.3° C. | $6.0\times10^{-4}$ mol/cc |
| 120 minutes | 405.5° C. | $7.0\times10^{-4}$ mol/cc |
| 180 minutes | 406.4° C. | $7.4\times10^{-4}$ mol/cc |

Atmospheric-Pressure Plasma Processing

Next, processing was carried out using the plasma processing system shown in FIG. 3, according to the procedure described previously and under the following conditions to obtain a developing roller according to this Experiment.

In the plasma processing system, which was installed in a room controlled to a temperature of 23° C. and a humidity of 50% RH, the processing object made up of the mandrel and superposed thereon the resin layer and the urethane resin film was so placed as to be 3 mm in distance between the urethane resin film surface and the electrode. The atmosphere in the chamber was set to be an atmospheric-pressure atmosphere of 78 vol. % of nitrogen, and its internal pressure was set to be 101,000 Pa. Next, the developing roller was rotatingly driven at a number of revolutions of 60 rpm, and electric power of 35 kHz in frequency was supplied at a power of 150 W and a duty ratio of 100% to carry out plasma processing. Processing time was set to be 3 seconds.

Evaluation Methods

About the developing roller produced in this Experiment, its average crosslinking density and average O/C atomic ratio were measured by the methods described previously, in respect of each region of up to 100 nm in depth, from 100 nm to 200 nm in depth and from 200 nm to 300 nm in depth from the surface.

Further, using another developing roller produced under the same conditions, image evaluation was made on an electrophotographic image forming apparatus. COLOR LASER JET 3600 (trade name), manufactured by Hewlett-Packard Co., was used as the electrophotographic image forming apparatus. As the process cartridge, a cyan process cartridge for exclusive use was used and only the developing roller was changed. Evaluation was made on the following.

Evaluation on Fog

The process cartridge fitted therein with the developing roller according to this Experiment was mounted to the main body of the electrophotographic image forming apparatus, and this was left to stand in an environment of temperature 15° C. and humidity 10% RH for 24 hours. Thereafter, in the same environment, images with a print percentage of 1% were reproduced on 25,000 sheets, which were more than those for nominal lifetime. Thereafter, in the same environment, solid white images were reproduced, and their fog values were measured in the following way.

The fog values were measured with a reflection densitometer TC-6DS/A (trade name; manufactured by Tokyo Denshoku Technical Center Company Ltd.) for reflection density of a transfer sheet before image formation and reflection density of a transfer sheet after solid white image formation, where an increment of the reflection density was regarded as a fog value of the developing roller. The reflection density was measured on the transfer sheet at the whole area of image-printed area, and the minimum value was regarded as the reflection density of that transfer sheet. The smaller the fog value is, the better. The results obtained were evaluated according to the following criteria.

A: Less than 1.0.

B: 1.0 or more to less than 2.0.

C, 3.0 or more to less than 5.0.

D: 5.0 or more.

Here, the evaluation "A" and the evaluation "B" are levels where any "fog" is not recognizable on images by visual observation. On the other hand, the evaluation "C" and the evaluation "D" are levels where "fog" is clearly recognizable on images by visual observation.

Usually, onto a transfer sheet on which solid white images have been formed, the developer stands little transferred, and the fog value thereon is smaller than 2.0. However, on any developing roller to the surface of which the developer has stuck, the developer on such a developing roller has an insufficient charge quantity. Hence, also when solid white images are formed, the developer moves onto the photosensitive member and is further transferred onto the transfer sheet to cause fog. Accordingly, the fog value may be used as an index of the sticking of a developer to the developing roller.

Evaluation on Set Marks

Next, the process cartridge likewise fitted therein with the developing roller according to this Experiment was left to stand in an environment of temperature 50° C. and humidity 95% RH for 20 days. Thereafter, the developing roller was taken out of the process cartridge, and the level of deformation was measured at its part coming into contact with the developing blade.

The deformation level of the developing roller was determined by the depth of a depression formed at its part coming into contact with the developing blade, and was measured with a laser displacement sensor (LT-9500V, trade name; manufactured by Keyence Corporation). The laser displacement sensor was set in the direction perpendicular to the developing roller surface to read any displacement of the developing roller surface in the state the developing roller was rotatingly driven, and the deformation level was measured at its part coming into contact with the developing blade. The deformation level was measured at five spots at intervals of 43 mm in the lengthwise direction, and was found as an average value of values at the five spots.

Thereafter, the developing roller was again fitted in the same process cartridge, and this was left to stand in an environment of temperature 15° C. and humidity 10% RH for 24 hours, which was thereafter mounted to the main body of the electrophotographic image forming apparatus in the same environment, where halftone images were printed. In the case of a large deformation level, horizontal line-shaped image defects (hereinafter "set marks") come about on images corresponding to the part at which the developing roller come into contact with the developing blade. Since a good correlation is seen between the deformation level and such image defects, the deformation level was used as an index of the set marks. Then, the deformation level was evaluated according to the following criteria.

A: The deformation level is less than 4.0 μm.

B: The deformation level is 4.0 μm or more to less than 5.0 μm.

C: The deformation level is 6.0 μm or more to less than 7.0 μm.

D: The deformation level is 7.0 μm or more.

Here, the evaluation "A" and the evaluation "B" are levels where any set marks are not recognizable on images by visual observation. On the other hand, the evaluation "C" and the evaluation "D" are levels where set marks are clearly recognizable on images by visual observation.

According to the above procedure and under conditions for atmospheric-pressure plasma processing which were changed by degrees, developing rollers according to Examples 1-1 to 1-5 and Comparative Examples 1-1 to 1-3 were produced, and these were evaluated. The conditions for atmospheric-pressure plasma processing were changed as shown in Table 2, in respect of the nitrogen concentration ($N_2$ level) in the atmosphere inside the chamber, the supply power, the processing time, whether or not pulses are modulated, and the duty ratio. In Table 2, the duty ratio is noted as 100% when pulses are not modulated.

The average crosslinking densities C1, C2 and C3 (mol/cm$^3$) at each region of up to 100 nm in depth, from 100 nm to 200 nm in depth and from 200 nm to 300 nm in depth from the surface, the average O/C atomic ratios O1, O2 and O3 at the same each region and the MD-1 hardness of the developing rollers obtained are shown in Table 2. The results of evaluation on the fog value and set marks of the developing rollers obtained are also shown together in Table 2.

Experiment 2

Examples 2-1, 2-2 & Comparative Examples 2-1, 2-2

Only the time of heat treatment for curing the coating film of the raw-material solution for the surface layer was changed to make urethane resin films have different average crosslinking densities from those in Experiment 1. Stated specifically, the heat treatment time was changed to 30 minutes, 45 minutes, 120 minutes and 180 minutes, and the other conditions were set alike. At this point, the average crosslinking densities of cured films of coating films of the raw-material solution for the surface layer as determined by the swelling method before the atmospheric-pressure plasma processing were $1.5\times10^{-4}$ mol/cm$^3$, $2.0\times10^{-4}$ mol/cm$^3$, $7.0\times10^{-4}$ mol/cm$^3$ and $7.4\times10^{-4}$ mol/cm$^3$, respectively. Also, their average O/C atomic ratios measured by the X-ray photoelectron spectroscopy ware all 0.40.

Thereafter, the atmospheric-pressure plasma processing was carried out under the conditions shown in Table 2, to produce developing rollers, which were then evaluated. Processing conditions set here and the results of evaluation on the developing rollers obtained are shown together in Table 2.

Experiment 3

Examples 3-1 to 3-5 & Comparative Examples 3-1, 3-2

As a raw material for the urethane resin film, the isocyanate to be mixed with a polyurethane polyol prepolymer was changed to produce urethane resin films having different average O/C atomic ratios from those in Experiment 1. Stated specifically, to 100.0 parts by mass of the polyurethane polyol prepolymer, 7.2 parts by mass of an isocyanate (trade name: TAKENATE B830; available from Mitsui Takeda Chemicals, Inc.) was added, so as to be in an NCO equivalent weight of 1.2. Except for this, the procedure of Experiment 1 was repeated to produce a processing object to be subjected to plasma processing. The above isocyanate is TMP modified TDI, having f (the number of functional groups): equal to 3. Further, the average crosslinking density of the urethane resin film according to this Experiment as determined by the swelling method before the plasma processing was 6.0×0-4 mol/cm$^3$, and its average O/C atomic ratio measured by the X-ray photoelectron spectroscopy was 0.30.

Thereafter, under conditions for atmospheric-pressure plasma processing which were changed by degrees, developing rollers were produced, and these were evaluated. Processing conditions set here and the results of evaluation on the developing rollers obtained are shown together in Table 2.

TABLE 2

| | Processing conditions | | | | Average crosslinking density ($\times 10^{-4}$ mol/cm$^3$) | | | Average O/C atomic ratio | | | | Evaluation | |
|---|---|---|---|---|---|---|---|---|---|---|---|---|---|
| | $N_2$ level (vol. %) | Power (W) | Time (sec) | Duty ratio (%) | C1 | C2 | C3 | O1 | O2 | O3 | MD-1 hardness | Fog value | Set marks |
| Cp. 1-1 | 78 | 100 | 3 | 100 | 4.8 | 4.5 | 4.4 | 0.36 | 0.38 | 0.40 | 34.1 | B | C |
| Ex. 1-1 | | 150 | 3 | 100 | 5.8 | 5.5 | | 0.41 | 0.40 | | 34.1 | A | B |
| Ex. 1-2 | | 100 | 10 | 70 | 6.6 | 6.3 | | 0.38 | 0.39 | | 34.2 | A | A |
| Ex. 1-3 | 95 | 100 | 10 | 70 | 9.9 | 8.5 | | 0.34 | 0.37 | | 34.1 | A | A |
| Ex. 1-4 | | 150 | 5 | 100 | 13.2 | 10.3 | | 0.32 | 0.36 | | 34.2 | A | A |
| Ex. 1-5 | 78 | 200 | 10 | 85 | 22.0 | 20.5 | | 0.44 | 0.42 | | 34.6 | B | A |
| Cp. 1-2 | | 200 | 20 | 100 | 26.3 | 20.6 | | 0.46 | 0.43 | | 34.4 | C | B |
| Cp. 1-3 | | 300 | 20 | 100 | 3.5 | 3.8 | | 0.47 | 0.45 | | 33.1 | C | D |
| Cp. 2-1 | 78 | 150 | 3 | 100 | 2.6 | 2.1 | 1.5 | 0.43 | 0.42 | 0.40 | 33.7 | B | C |
| Ex. 2-1 | | | | | 2.8 | 2.5 | 2.0 | 0.41 | 0.40 | | 33.6 | A | B |
| Ex. 2-2 | | | | | 9.6 | 8.8 | 7.0 | 0.42 | 0.42 | | 34.2 | A | B |
| Cp. 2-2 | | | | | 10.8 | 9.6 | 7.4 | 0.40 | 0.40 | | 34.5 | C | B |
| Cp. 3-1 | 78 | 100 | 3 | 100 | 7.0 | 6.4 | 6.0 | 0.28 | 0.28 | 0.30 | 33.3 | B | C |
| Ex. 3-1 | | 150 | 3 | 100 | 7.8 | 6.6 | | 0.30 | 0.30 | | 33.3 | A | B |
| Ex. 3-2 | | 100 | 10 | 70 | 9.0 | 7.5 | | 0.30 | 0.30 | | 33.5 | A | A |
| Ex. 3-3 | 95 | 100 | 10 | 70 | 13.6 | 8.9 | | 0.28 | 0.29 | | 33.5 | A | A |
| Ex. 3-4 | | 150 | 5 | 100 | 18.0 | 14.1 | | 0.27 | 0.28 | | 33.4 | A | A |
| Ex. 3-5 | 78 | 200 | 10 | 85 | 30.0 | 23.3 | | 0.33 | 0.32 | | 34.8 | B | A |
| Cp. 3-2 | | 200 | 20 | 100 | 34.1 | 32.1 | | 0.35 | 0.34 | | 34.6 | C | B |

Cp.: Comparative Example;
Ex.: Example

As can be seen from the results shown in Table 2, in Experiment 1, good image formation was achievable in Examples 1-1 to 1-5, in which the C1, C2 and C3 and the O1, O2 and O3 fulfilled the conditions (1) to (5). Further, much better image formation was achievable in Examples 1-2 to 1-4, in which they fulfilled the conditions (6) and (7) as well. In Experiment 2, good image formation was also achievable in Examples 2-1 and 2-2, in which the C1, C2 and C3 and the O1, O2 and O3 fulfilled the conditions (1) to (5).

In Experiment 3, good image formation was also achievable in Examples 3-1 to 3-5, in which the C1, C2 and C3 and the O1, O2 and O3 fulfilled the conditions (1) to (5). Further, much better image formation was achievable in Examples 3-2 to 3-4, in which they fulfilled the conditions (6) and (7) as well.

Experiment 4

Examples 4-1 to 4-5

The number of parts by mass of the quartz powder to be compounded in the resin layer raw-material liquid silicone rubber and the layer thickness of the urethane resin film were changed and further the atmospheric-pressure plasma processing was carried out under the same conditions as in Example 1-2 to produce developing rollers different in MD-1 hardness. Production conditions set here and the results of evaluation on the developing rollers obtained are shown together in Table 3.

TABLE 3

| | Production conditions | | Average crosslinking density ($\times 10^{-4}$ mol/cm$^3$) | | | Average O/C atomic ratio | | | | Evaluation | |
|---|---|---|---|---|---|---|---|---|---|---|---|
| | Quartz powder [part(s)] | Layer thickness (μm) | C1 | C2 | C3 | O1 | O2 | O3 | MD-1 hardness | Fog value | Set marks |
| Ex. 4-1 | 0 | 7.8 | 6.5 | 6.1 | 4.4 | 0.38 | 0.39 | 0.40 | 23.3 | A | B |
| Ex. 4-2 | 2 | 10.3 | 6.4 | 6.2 | | 0.38 | 0.40 | | 25.0 | A | A |
| Ex. 4-3 | 7 | 12.0 | 6.6 | 6.1 | | 0.39 | 0.40 | | 34.5 | A | A |
| Ex. 4-4 | 20 | 20.1 | 6.5 | 6.3 | | 0.38 | 0.39 | | 40.0 | A | A |
| Ex. 4-5 | 30 | 22.0 | 6.6 | 6.2 | | 0.37 | 0.39 | | 41.1 | B | B |

Ex.: Example

As can be seen from the results shown in Table 3, much better image formation was achievable in Examples 4-2 to 4-4, in which the MD-1 hardness of the developing rollers was set within the range of from “25° or more to 40.0° or less.

Experiment 5

Examples 5-1 to 5-9

The conditions for atmospheric-pressure plasma processing on the processing object produced in Experiment 1 were changed as shown below in Table 4, where developing rollers were produced and these were evaluated. The plasma processing conditions were changed as shown in Table 4, in respect of the nitrogen concentration ($N_2$ level) in the atmosphere inside the chamber and the duty ratio of pulse modulation.

Further, in this Experiment, evaluation was made together on the external appearance of each developing roller after the atmospheric-pressure plasma processing. In carrying out the atmospheric-pressure plasma processing, the electric power was set higher in order to shorten the processing time, where very small spark marks came about in some cases after the processing. Accordingly, as evaluation of the external appearance, whether or not any spark marks came about when the power was set relatively high and whether or not any image defects appeared were evaluated according to the following criteria.

A: Any spark marks are not present, and any image defects do not appear.

B: Spark marks are present, but any image defects do not appear.

C: Spark marks are present, and image defects are recognizable.

Processing conditions set here and the results of evaluation on the developing rollers obtained are shown together in Table 4.

TABLE 4

| Example: | Processing conditions: $N_2$ level (vol. %) | Power (W) | Time (sec) | Duty ratio (%) | Average crosslinking density ($\times 10^{-4}$ mol/cm$^3$): C1 | C2 | C3 | Average O/C atomic ratio: O1 | O2 | O3 | MD-1 hardness | Evaluation: Fog value | Set marks | Appearance |
|---|---|---|---|---|---|---|---|---|---|---|---|---|---|---|
| 5-1 | 78 | 250 | 3 | 100 | 10.7 | 9.6 | 4.4 | 0.44 | 0.43 | 0.40 | 34.5 | A | B | B |
| 5-2 | 90 | | | | 15.6 | 12.6 | | 0.43 | 0.41 | | 34.5 | B | A | B |
| 5-3 | 95 | | | | 13.1 | 11.1 | | 0.39 | 0.40 | | 34.6 | A | A | A |
| 5-4 | 99 | | | | 11.7 | 10.3 | | 0.33 | 0.37 | | 34.4 | A | A | A |
| 5-5 | 78 | | | 90 | 10.3 | 6.8 | | 0.42 | 0.41 | | 34.3 | A | B | B |
| 5-6 | | | | 80 | 12.6 | 7.4 | | 0.39 | 0.40 | | 34.4 | A | A | A |
| 5-7 | | | | 70 | 13.1 | 8.2 | | 0.35 | 0.37 | | 34.3 | A | A | A |
| 5-8 | | | | 50 | 10.6 | 6.9 | | 0.36 | 0.38 | | 34.3 | A | A | A |
| 5-9 | | | | 40 | 6.3 | 5.9 | | 0.37 | 0.40 | | 34.1 | A | B | A |

As can be seen from the results shown in Table 4, better image formation was achievable in Examples 5-3 and 5-4, in which the atmospheric-pressure plasma processing was carried out in an atmosphere of 95 vol. % or more of nitrogen. Better image formation was also achievable in Examples 5-6 to 5-8, in which the atmospheric-pressure plasma was formed by supplying high-frequency power which was pulse-modulated in a duty ratio of from 50% or more to 80% or less by the pulse width modulation method.

The above embodiments are all only those showing examples of embodiment in practicing the present invention, and shall not be those by which the technical scope of the present invention is construed as being restrictive. That is, the present invention may be practiced in various forms without deviation from its technical idea or its main features.

This application claims the benefit of Japanese Patent Application No. 2008-027633, filed Feb. 7, 2008, which is hereby incorporated by reference herein in its entirety.

What is claimed is:

1. An electrophotographic developing member comprising a mandrel and a surface layer containing a urethane resin, the surface layer being provided on the peripheral surface of the mandrel, wherein;

the surface layer satisfies the following relationships (1) to (3) where the average crosslinking density in each region of up to 100 nm in depth, from 100 nm to 200 nm in depth and from 200 nm to 300 nm in depth from the surface of the surface layer is represented by C1, C2 and C3 (mol/cm$^3$):

$$C3<C2<C1; \quad (1)$$

$$C3\times 1.3 \leqq C1 \leqq C3\times 5.0; \text{ and} \quad (2)$$

$$2.0\times 10^{-4} \leqq C3 \leqq 7.0\times 10^{-4}. \quad (3)$$

2. The electrophotographic developing member according to claim 1, wherein;

the surface layer satisfies the following relationships (4) and (5) where the average atomic percentage ratio of oxygen atoms (O) to carbon atoms (C), average O/C atomic ratio, as measured by X-ray photoelectron spectroscopy in each region of up to 100 nm in depth, from 100 nm to 200 nm in depth and from 200 nm to 300 nm in depth from the surface of the surface layer, is represented by O1, O2 and O3:

$$O3\times 0.8 \leqq O1 \leqq O3\times 1.1; \text{ and} \quad (4)$$

$$0.27 \leqq O1 \leqq 0.44. \quad (5)$$

3. The electrophotographic developing member according to claim 1, wherein;

the surface layer further satisfies the following relationships (6) and (7):

$$C3\times1.5 \leqq C1 \leqq C3\times3.0; \text{ and} \quad (6)$$

$$O1 \leqq O2 \leqq O3. \quad (7)$$

4. The electrophotographic developing member according to claim 1, which comprises a resin layer and the surface layer in this order on the peripheral surface of the mandrel.

5. The electrophotographic developing member according to claim 1, having an MD-1 hardness of from 25.0° or more to 40.0° or less.

6. A process for producing the electrophotographic developing member according to claim 1; the process comprising the step of subjecting a cured film of a coating film of a raw-material solution for the surface layer to plasma processing under atmospheric pressure.

7. The process for producing the electrophotographic developing member, according to claim 6, wherein the plasma processing is carried out in an atmosphere of 95 vol. % or more of nitrogen.

8. The process for producing the electrophotographic developing member, according to claim 6, wherein the plasma used in the plasma processing is formed by supplying high-frequency power which has been pulse-modulated in a duty ratio of from 50% or more to 80% or less by a pulse width modulation method.

9. An electrophotographic process cartridge comprising at least a photosensitive member for forming thereon an electrostatic latent image and an electrophotographic developing member and being so constituted as to be detachably mountable to the main body of an electrophotographic image forming apparatus, wherein; the electrophotographic developing member is one according to claim 1.

10. An electrophotographic image forming apparatus comprising at least a photosensitive member for forming thereon an electrostatic latent image and an electrophotographic developing member, wherein; the electrophotographic developing member is one according to claim 1.

* * * * *